US006476081B1

(12) United States Patent
Hillion et al.

(10) Patent No.: US 6,476,081 B1
(45) Date of Patent: Nov. 5, 2002

(54) PROCESS FOR THE MANUFACTURE OF COMPOSITIONS WHICH CAN BE USED AS EMULSIFYING AND DISPERSING SURFACTANTS THE COMPOSITIONS OBTAINED AND THEIR USES

(75) Inventors: Gérard Hillion, Herblay; Isabelle Durand, Rueil Malmaison; Anne Sinquin, Nanterre; Marie Velly, Montesson, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/573,559

(22) Filed: May 19, 2000

(30) Foreign Application Priority Data

May 19, 1999 (FR) ............................................. 99 06448

(51) Int. Cl.⁷ ............................ B01F 17/22; B01F 3/04; B01F 3/08
(52) U.S. Cl. ............................ 516/15; 516/27; 516/31; 516/33; 516/69; 516/915; 554/25; 554/26; 554/66
(58) Field of Search ............................ 516/15, 27, 31, 516/33, 69, 915; 554/25, 26, 66; 44/389, 391, 408, 409; 508/454, 455, 456; 585/15

(56) References Cited

U.S. PATENT DOCUMENTS 5,537,508 A * 7/1996 Ebbing et al. ............... 392/399
5,958,844 A * 9/1999 Sinquin et al. ............... 585/15
6,221,920 B1 * 4/2001 Hillion et al. ................ 516/15
6,350,889 B1 * 2/2002 Pavlin ......................... 554/25

FOREIGN PATENT DOCUMENTS

| EP | 905 350 A1 | * | 3/1999 |
| FR | 2 768 732 | | 3/1999 |

* cited by examiner

Primary Examiner—Daniel S. Metzmaier
(74) Attorney, Agent, or Firm—Millen, White, Zelano & Branigan, P.C.

(57) ABSTRACT

In order to manufacture a composition mainly containing compounds with ester and amide functions, in particular in the form of ester-amides, as well as compounds with amine functions, such as ester-amines, the salts of amines, monoglycerides and diglycerides, formed from monomeric, dimeric, trimeric and/or tetrameric fatty acids contained in a polymerized polyunsaturated oil, a process is implemented which comprises the following stages:

a) use (or preparation) of a polymerized oil by polymerization of a polyunsaturated vegetable or animal oil;

b) treatment of said polymerized oil by entrainment with water vapor; and c) reaction of the polymerized oil thus treated with an excess of at least one aminoalcohol, in the presence or not of a catalyst.

This composition can be used as an emulsifying and dispersing surfactant, in particular as an additive for dispersing hydrates in oil effluents.

21 Claims, No Drawings

PROCESS FOR THE MANUFACTURE OF COMPOSITIONS WHICH CAN BE USED AS EMULSIFYING AND DISPERSING SURFACTANTS THE COMPOSITIONS OBTAINED AND THEIR USES

FIELD OF THE INVENTION

The invention relates to a novel manufacturing process for compositions that can be used as emulsifying and dispersing surfactants. It also relates to the compositions obtained and their uses.

DESCRIPTION OF THE PRIOR ART

In U.S. Pat. No. 6,221,920, the Assignee described a process for the production of a composition consisting of a mixture containing at least amides, amines, ester-amides, ester-amines, salts of amines and mono-glycerides, deriving from the monomeric, dimeric, trimeric and/or tetrameric fatty acids contained in a polymerized polyunsaturated oil, this process comprising the transamdification (and transesterification) reaction of a thermally polymerized polyunsaturated oil, with at least one aminoalcohol, used in excess.

The composition obtained could be used, without any purification, as an emulsifying and dispersing surfactant, as such or after dilution with various solvents, such as, for example, aromatic fractions, various alcohols or also certain fatty acid esters.

It was indicated that the compositions thus defined could be used in a large number of applications, for example, as emulsifying agents allowing the formation of oil-in-water or water-in-oil emulsions, depending on the nature of the oil and the respective proportions of the two constituents (the hydrophilic constituent and the hydrophobic constituent). They could also be used as dispersing agents for solids or as foam stabilizers in a liquid or in an emulsion. A particular use which was indicated consisted of forming stable dispersions of ice in hydrocarbon media, for example, in light condensates of oil.

U.S. Pat. No. 5,958,844 describes another particular application of the compositions prepared according to the process of U.S. Pat. No. 6,221,920. This application consists of using them as dispersing additives for hydrates in suspension in fluids containing at least water, a gas and a liquid hydrocarbon (under conditions where hydrates may form the water and gas), in a manner so as to facilitate transport of same.

SUMMARY OF THE INVENTION

It has now been found in a surprising fashion that it is possible to improve the properties of these compositions by subjecting the polymerized oil, before reaction with the aminoalcohol, to an operation of entraining with water vapor having the effect of deodorizing the polymerized oil and eliminating degradation products which could be present in the polymerized oils and pose problems vis-a-vis certain media in which the final compositions may be used.

DETAILED DESCRIPTION OF THE INVENTION

The invention therefore proposes a novel preparation process for compositions that can be used as emulsifying and dispersing surfactants defined by the fact that it comprises the following stages:

a) use (or preparation) of a polymerized oil by polymerization of a polyunsaturated vegetable or animal oil;

b) treatment of said polymerized oil by entrainment with water vapor; and c) reaction of the polymerized oil thus treated with an excess of at least one aminoalcohol in the presence or not of a catalyst.

In order to prepare the compositions according to the invention, a commercial polymerized polyunsaturated oil can be used, such as the products known under the names "standolie", "stand oils" or "bodied oils". In this case, stage (c) of the process is carried out directly.

In a different manner, if in stage (a) one has to prepare the polymerized oil, one can start from any vegetable or animal oil having a degree of polyunsaturation sufficient to allow the polymerization, by contact of the fatty chains containing diene or triene between themselves, as is the case, for example, for linoleic and linolenic acid. As examples the following oils can be mentioned: linseed, sunflower, safflower, china wood, grapeseed, soybean or corn, or certain fish oils, as well as any other oils having high levels of linoleic and/or linolenic acid. Linseed oil is preferred in the process according to the invention An approximate composition in fatty acids of linseed oil is as follows:

palmitic acid: 5.5% by weight
stearic acid: 3.5% by weight
oleic acid: 19.0% by weight
linoleic acid: 14.4% by weight
linolenic acid: 57.6% by weight The polymerization of a polyunsaturated oil can be carried out according to any appropriate method, thermally or by catalytic route. The polymerization by essentially thermal route can be carried out by simple heating to approximately 300° C. under nitrogen. The heating time then determines a viscosity gradient of the polymerized oil, which can reach, after a heating time for example of 20 hours or more, a dynamic viscosity of 65 Pa.s at 20° C.

The polymerization can also be carried out at 280–290° C. under reduced pressure in the presence of anthraquinone or benzoquinone (see Nisshin Oils Mills, Yokohama, Japan, Nagakura and Coll. (1975), 48(4), 217–22).

When the polymerized polyunsaturated oil used in the manufacturing process according to the invention is prepared, in order to reduce the duration of the polymerization and therefore the risk of forming undesirable degradation products, provision can also be made to catalyze the polymerization of the starting polyunsaturated oil by metals, such as for example, zinc, lead, tin or copper in the form of nitrates, chlorides or stearates, or also manganese in the form of oxide or of a salt. In this respect, there can be mentioned for example the heating for 6 hours of the linseed oil with copper (II) nitrate in a proportion of 0.5 to 2% by weight relative to the starting oil described by Sil S. and Koley S. N., Department of Chemical Technology, Univ. of Calcutta (1987) 37(8), 15–22.

Among the metal catalysts used to reduce the duration of the reaction, a salt or dioxide of manganese $MnO_2$ can be advantageously used, for example in a proportion of 0.5 to 2% by weight relative to the starting oil. Such catalysts can in fact be left in the final product without causing problems of toxicity or compatibility with the media in which the additive will be finally used.

In all cases, in order to be able to be used in the production process according to the invention, the polymerized oils advantageously have a dynamic viscosity at 20° C. of 5 to 65 Pa.s and preferably of 10 to 20 Pa.s. They generally have an acid number of 8 to 20. Similar viscosities are generally preserved after the treatment by entraining with water vapor of stage (b), as will be described below. As regards the acid number, it is generally lowered by this treatment.

The composition of the oligomers of fatty acids contained in a polymerized linseed oil having a dynamic viscosity at 20° C. of 65 Pa.s is given hereafter, by way of example:

monomeric fatty acids: 44.10% by weight dimeric fatty acids: 32.30% by weight trimeric fatty acids: 14.50% by weight higher oligomers 9.10% by weight.

These values were obtained after methanolysis of the polymerized oil, and the separation of the methyl esters of the different fatty acids (monomers, dimers, trimers and higher oligomers) was achieved by gel-permeation chromatography (GPC). The acid number of the polymerized oil is equal to 16 mg of KOH/g.

The product of the polymerization reaction, after methanolysis, can be purified by distillation in order to eliminate from it the esters fraction corresponding to the monomeric fatty acids. A mixture is then obtained which contains approximately 1% of monomeric acids, approximately 75% of dimeric acids, approximately 19% of trimeric acids and approximately 5% of higher oligomers.

In stage (b) of the process according to the invention, the polymerized oil which is used or as obtained at the end of stage (a) is subjected to an entrainment with water vapor.

In order to carry out this treatment, a stream of dry water vapor is passed over the polymerized oil to be treated, in a quantity of 5 to 30% by weight relative to the oil for example, at a temperature of 180 to 250° C., under a vacuum of 7 to 2.5 kPa and for a period of 1 to 5 hours.

The amidification reaction of the fatty acids by the primary or secondary functions of the aminoalcohols used in stage (c) of the process according to the invention, accompanied by the transesterification of the ester functions of glycerol by the alcohol functions of said aminoalcohols is known from the prior art and can be carried out at a temperature of 100 to 200° C. and preferably 110 to 160° C., preferably without catalyst with elimination of the water vapor as it forms, either by using a third solvent in order to obtain an azeotrope, or by operating without solvent, but by elimination of the water by distillation under reduced pressure (see for example U.S. Pat. No. 2,089,212 and the article by Harry Kroll and Herbert Nadeau in J.A.O.C.S. 34, 323–326, June 1957). The reaction can also be catalyzed, which appreciably reduces its duration. As catalysts, alkaline alcoholates of lithium, sodium or potassium methylate or ethylate type are generally used. The reaction time is then 15 to 200 minutes; preferably, the reaction is stopped after 100 minutes.

The molar ratio of the aminoalcohol to the polymerized oil, expressed as the moles of fatty acids which it contains, is generally from 1/1 to 2/1, preferably, of the order of 1.5/1.

The aminoalcohols which are capable of being used are, for example, monoethanolamine, monopropanolamine, monoisopropanolamine, 1-amino-butanol, 2-amino-1-butanol, N-methylethanolamine, N-butylethanolamine, pentanolamine, hexanolamine, cyclohexanolamine, polyalcoholamines or also polyalkoxyglycolamines, as well as aminated polyols such as diethanolamine, diisopropanolamine or trihydroxy-methylaminomethane. Diethanolamine will preferably be used.

The product obtained by the process according to the invention consists of a composition mainly containing compounds with ester and amide functions, in particular in the form of ester-amides, as well compounds with amine functions, such as ester-amines, the salts of amines, monoglycerides and diglycerides, formed from monomeric, dimeric, trimeric and/or tetrameric fatty acids, contained in the polymerized polyunsaturated oil. It can be used directly without any purification, either as such or after dilution in a solvent suitable for the emulsifying application chosen. The compatible solvents which may be used can be chosen from the aromatic solvents, such as for example toluene or xylenes, the fractions of aromatic solvents; monoalcohols, such as for example, methanol, ethanol, propanol, isopropanol, butanol, isobutanol or dodecanol; diols such as for example monopropylene glycol or diethylene glycol; and all the esters of C1 to C4 monoalcohols and the C6 to C22 fatty acids, such as for example those deriving from vegetable or animal oils or fats, as well as the same pure esters, such as for example methyl or ethyl hexanoate or octoate.

The esters of the C1 to C4 monoalcohols and the C6 to C22 fatty acids deriving from vegetable or animal oils or fats can be chosen for example from the methyl and ethyl esters of the following oils: copra, babassu, palm nut, tucum, murumuru, palm, shea butter, olive, peanut, kapok, bitter date, papaya, colocynth, croton, earth almond, spurge, hemp seed, beech, okra, curcas, cameline, safflower, Niger seed, sunflower, oleic sunflower, rubber tree, coconut, jalop, walnut, corn, soybean, cotton seed, sorghum, grapeseed, linseed, tobacco, common wood turpentine, afzellie, swede, wild mustard seed, brown mustard seed, china wood, candlenut, tung tree, amoora, fir, cramble, perilla, erucic rapeseed, low eruric rapeseed, oleic rapeseed, sesame, cocoa butter, tall oil, wheatgerm and castor, as well as certain fish oils; and among the methyl and ethyl esters of fats such as lard, tallow and melted butter, as they are or partially hydrogenated.

In certain applications where it can have contact with the environment, the use of aromatic solvents must be avoided and solvents having a non-toxicity and a certain biodegradability must be used instead; in this case, fatty esters originating from vegetable bases will advantageously be used as solvents, such as for example the methyl or ethyl ester of rapeseed oil.

The compositions obtained by the process according to the invention are of particular use as dispersing additives for hydrates in oil effluents intended to reduce the tendency to agglomerate of said hydrates. In this use, these compositions are added to the fluid to be treated at concentrations ranging in general from 0.1 to 5% by weight, preferably 0.2 to 2% by weight relative to the water.

The entire disclosure of all applications, patents and publications, cited above and below, and of corresponding French application 99/06448, filed May 19, 1999 are hereby incorporated by reference.

The following examples illustrate the invention but must in no way be considered as limitative. Example 3 is given by way of comparison.

EXAMPLE 1

325 g of a polymerized linseed oil (which corresponds to 0.37 mole equivalents of triglycerides) having a dynamic viscosity of 10 Pa.s at 20° C. is introduced under a nitrogen atmosphere into a one-liter flask capable of holding a vacuum, provided with a mechanical agitation system and which can be heated via an oil bath.

This polymerized oil has the following composition in fatty acids and oligomers of fatty acids:

monomeric fatty acids: 48.8% by weight dimeric fatty acids: 31.4% by weight trimeric fatty acids: 13.0% by weight higher oligomers: 5.8% by weight.

Its acid number is equal to 10.

The product is taken to a temperature of 230° C., under a dynamic vacuum of 0.25 to 0.40 kPa. The dry water vapor is slowly introduced into the product agitated at 230° C. via a dipping tube. The vacuum is stabilized to a value of 4.70 kPa by a fine adjustment of the flow rate of the water vapor introduced. After treatment for 2 hours, 22.5 g of water as well as 0.27 g of an insoluble organic fraction are collected in a vacuum trap immersed in liquid nitrogen. The vacuum in the apparatus is broken with nitrogen and the product is cooled down to 160° C.

The composition of the polymerized oil in fatty acids and oligomers of fatty acids after this treatment has not changed. Its acid number is 6.3.

Then 175 g (i.e. 1.66 moles) of diethanolamine is added. After reacting for 15 to 20 minutes at 160° C., the product becomes homogeneous and limpid. This temperature of 160° C. is maintained for 100 minutes before the mixture is cooled down.

The product is diluted in the reaction flask by introducing 500 g of an aromatics fraction the distillation range of which is comprised between 180 and 215° C.

The mixture thus obtained is a yellow liquid with a density at 25° C. of 0.950, a dynamic viscosity at 20° C. of approximately 0.2 Pa.s, a flash point greater than 60° C. and a pour-point lower than 20° C.

EXAMPLE 2

440 g of refined linseed oil (0.5 mole, calculated as equivalents of triglycerides) and 4.4 g of manganese oxide reduced to powder are introduced into a one-liter flask which is agitated and heated. The apparatus is purged of its air by passing a stream of nitrogen through it and the mixture formed is heated under agitation to approximately 290–300° C. After reaction for 5 hours the viscosity of the mixture reaches 9.7 Pa.s. The reaction mixture is cooled down to 120° C. under a nitrogen atmosphere and the insoluble manganese oxide is eliminated by filtration. One part of the metal used was converted into a soap of soluble manganese, which can be left in the product.

The polymerized linseed oil has the following composition in fatty acids and oligomers of fatty acids:

monomeric fatty acids: 47.9% by weight dimeric fatty acids: 27.4% by weight trimeric fatty acids: 11.3% by weight higher oligomers: 13.4% by weight.

Its acid number is equal to 8.5.

An operation of entrainment with water vapor is carried out on this crude product under the same conditions as in Example 1. The composition of the product obtained in fatty acids and oligomers of fatty acids remains unchanged, but its acid number is 5.1.

The preparation of the product is continued as described in Example 1.

The product obtained is diluted in the reaction flask by introducing 500 g of an aromatics fraction the distillation range of which is comprised between 180 and 215° C.

The mixture thus obtained has a density at 25° C. of 0.950, a dynamic viscosity at 20° C. of 0.2 Pa.s, a flash point greater than 60° C. and a pour point lower than 20° C.

In the following examples, the effectiveness, as additives for dispersing the hydrates in an oil effluent, of the products prepared as described in Examples 1 and 2 is tested. The transport of fluids forming hydrates, such as oil effluents, is simulated and tests are carried out on the formation of hydrates from gas, condensate and water, using the apparatus described below.

The apparatus comprises a 10-meter loop constituted by tubes with an internal diameter equal to 7.7 mm; a 2-liter reactor containing an inlet and outlet for the gas, an intake pipe and discharge pipe for the mixture: condensate, water and additive initially introduced. The reactor allows the loop to be pressurized.

Tubes of a similar diameter to those of the loop ensure the circulation of the fluids from the loop to the reactor, and vice versa, by means of a gear pump placed between the two. A sapphire cell integrated in the circuit allows visualization of the liquid in circulation, and therefore the hydrates, if they are formed.

In order to determine the effectiveness of the additives according to the invention, the fluids (water, oil, additive) are introduced into the reactor; the installation is then pressurized to 70 bar. Homogenization of the liquids is ensured by their circulation in the loop and the reactor, then solely in the loop. While monitoring the variations in the loss of head and flow rate, a rapid lowering of the temperature is imposed, from 17° C. to 4° C. (temperature lower than the formation temperature of the hydrates), this is then maintained at this value.

The duration of the tests can vary from a few minutes to several hours: a high-performance additive allows the circulation of the suspension of hydrates to be maintained with stable loss of head and flow rate.

EXAMPLE 3

Comparative

In this example, the operation is carried out with a fluid composed 10% of water and 90% of condensate by volume.

The composition by weight of the condensate is:

for the molecules having less than 11 carbon atoms: 20% paraffins and isoparaffins, 48% naphthenes, 10% aromatics; and for the molecules having at least 11 carbon atoms: 22% of a mixture of paraffins, isoparaffins, naphthenes and aromatics.

The gas used contains 98% methane and 2% ethane by volume. The experiment is carried out under a pressure of 7 MPa, which is held constant by a supply of gas. Under these conditions, the formation of a plug is observed in the coil a few minutes after the formation of hydrates starts (at a temperature of approximately 10.8° C.); the hydrates form a blockage and circulation of the fluid becomes impossible.

EXAMPLE 4

In this example, the operation is carried out as in comparative Example 3 with the same fluid, the same gas and at the same pressure, however, 1% by weight relative to the water of the product produced in Example 1 is added to the fluid in circulation. Under these conditions an increase in the loss of head is observed when the formation of the hydrates occurs (at a temperature of approximately 10° C.), followed by its reduction and its stabilization for more than 24 hours at a temperature of 4° C. Lowering the temperature to 0C does not affect the circulation of the suspension, the hydrates remaining dispersed in the fluids.

EXAMPLE 5

In this example, the operation is carried out as in comparative Example 3 with the same fluid, the same gas and at the same pressure, however, 1% by weight relative to the water of the product produced in Example 2 is added to the fluid in circulation. Under these conditions an increase in the loss of head is observed when the formation of the hydrates occurs (at a temperature of approximately 10° C.), followed by its reduction and its stabilization for more than 24 hours at a temperature of 4° C. Lowering the temperature to 0° C. does not affect the circulation of the suspension, the hydrates remaining dispersed in the fluids.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a composition comprising a compound having at least one ester function and at least one amide function, said process comprising the following stages:
   (a) providing a polymerized a polyunsaturated vegetable or animal oil;
   (b) entraining said polymerized oil with water vapor; and
   (c) reacting the resultant polymerized oil from stage (b) with an excess of at least one aminoalcohol, optionally in the presence of a catalyst.

2. A process according to claim 1, wherein stage (a) comprises polymerizing a polyunsaturated vegetable or animal oil.

3. A process according to claim 2, wherein the polymerizing comprises thermal polymerizing.

4. A process according to claim 2, wherein the polymerizing comprises catalytic polymerizing.

5. A process according to claim 4, wherein the catalytic polymerization of the polyunsaturated vegetable or animal oil is conducted in the presence of manganese dioxide or a salt of manganese as the catalyst.

6. A process according to claim 1, wherein the polyunsaturated vegetable oil comprises linseed oil.

7. A process according to claim 1, wherein stage (b) comprises passing a stream of dry water vapor over the polymerized oil, in a quantity of 5 to 30% by weight relative to the oil, at a temperature of 180 to 250° C., under a vacuum of 7 to 2.5 kPa for a period of 1 to 5 hours.

8. A process according to claim 1, wherein the aminoalcohol to the polymerized oil molar ratio, expressed as the moles of fatty acids which it contains, is from 1/1 to 2/1.

9. A process according to claim 8, wherein the molar ratio of the aminoalcohol to the polymerized oil, expressed as the moles of fatty acids which it contains, is 1.5/1.

10. A process according to claim 1, further comprising diluting the polymerized oil with a solvent after said polymerized oil reacts with the at least one aminoalcohol.

11. A process according to claim 10, wherein the solvent is selected from the group consisting of aromatic solvent, monoalcohol, diol, ester of a C1 to C4 monoalcohol with a C6 to C22 fatty acid and mixtures thereof.

12. A process according to claim 11, wherein the solvent is methyl hexanoate, ethyl hexanoate, methyl octoate, or ethyl octoate.

13. A process according to claim 1, wherein the aminoalcohol is diethanolamine.

14. A process according to claim 1, wherein stage (c), comprises heating the polymerized oil with the at least one aminoalcohol for 15 to 200 minutes.

15. A process according to claim 14, wherein the heating is for 15–20 minutes.

16. A process according to claim 1, wherein in stage (c), the temperature is from 100 to 200° C.

17. A process according to claim 16, wherein the temperature is at least 160° C.

18. A process according to claim 1, wherein the compound has an ester-amide function and an ester-amine function.

19. A process according to claim 1, wherein the polymerized polyunsaturated oil comprises dimeric, trimeric, and/or tetrameric fatty acids, further optionally comprising monomeric fatty acids.

20. A process according to claim 1, wherein the polymerized oil has a dynamic viscosity of 5 to 65 Pa.s at 20° C.

21. A process according to claim 1, wherein the compound having at least one ester function and at least one amide function further comprising compounds with amine functions, salts of amines, monoglycerides, and diglycerides.

* * * * *